United States Patent
Raikar et al.

(10) Patent No.: US 8,792,511 B2
(45) Date of Patent: Jul. 29, 2014

(54) SYSTEM AND METHOD FOR SPLIT RING FIRST IN FIRST OUT BUFFER MEMORY WITH PRIORITY

(75) Inventors: Rayesh Raikar, Bangalore (IN); Santosh Narayanan, Bangalore (IN); Govidarajan Mohandoss, Bangalore (IN); Ranjith Kumar Kotikalaoudi, Bangalore (IN)

(73) Assignee: LSI Corporation, Milpitas, CA (US)

( * ) Notice: Subject to any disclaimer, the term of this patent is extended or adjusted under 35 U.S.C. 154(b) by 129 days.

(21) Appl. No.: 13/088,422

(22) Filed: Apr. 18, 2011

(65) Prior Publication Data

US 2012/0263181 A1 Oct. 18, 2012

(51) Int. Cl.
*H04L 12/56* (2006.01)
*G06F 3/00* (2006.01)

(52) U.S. Cl.
CPC ......... *H04L 49/9005* (2013.01); *H04L 49/9031* (2013.01); *H04L 49/9052* (2013.01)
USPC ............................................. 370/412; 710/56

(58) Field of Classification Search
USPC .................... 370/412, 428; 710/52
See application file for complete search history.

(56) References Cited

U.S. PATENT DOCUMENTS

| 7,630,388 B2 | 12/2009 | Wezelenburg | |
|---|---|---|---|
| 2003/0061269 A1* | 3/2003 | Hathaway et al. | 709/202 |
| 2003/0210686 A1* | 11/2003 | Terrell et al. | 370/389 |
| 2004/0103245 A1* | 5/2004 | Fukusawa et al. | 711/113 |
| 2004/0202073 A1* | 10/2004 | Lai et al. | 369/47.33 |
| 2006/0075203 A1* | 4/2006 | Dutta | 711/173 |
| 2008/0074996 A1* | 3/2008 | Fourcand | 370/225 |
| 2009/0240874 A1* | 9/2009 | Pong | 711/105 |
| 2010/0180006 A1* | 7/2010 | Nourbakhsh et al. | 709/213 |
| 2011/0225376 A1* | 9/2011 | Hasting et al. | 711/154 |
| 2012/0233418 A1* | 9/2012 | Barton et al. | 711/162 |
| 2012/0233463 A1* | 9/2012 | Holt et al. | 713/168 |

\* cited by examiner

*Primary Examiner* — Dang Ton
*Assistant Examiner* — Ryan Kavleski
(74) *Attorney, Agent, or Firm* — Prakash Nama; Global IP Services, PLLC

(57) ABSTRACT

A system and method for allocating memory locations in a buffer memory system is described. The system includes a plurality of memory locations for storage and a controller. The controller controls the storage and retrieval of data from the plurality of memory locations and allocate a first portion of the memory locations to a first buffer, wherein the remaining portion of the memory locations defines a second portion. The controller allocates a portion of the second portion to a second buffer and the remaining portion of the second portion defines a third portion. The controller reserves a portion of the third portion for assignment to the second buffer, wherein, the second buffer is assigned a higher priority over the first buffer. The controller selectively allocates one or more memory locations of the third portion to the first buffer or to the second buffer.

12 Claims, 9 Drawing Sheets

| SIGNAL | TYPE | DESCRIPTION |
|---|---|---|
| DATA_FULL | OUTPUT | NORMAL DATA REGION FULL:NO ADDITIONAL DATA WRITE CAN BE PERFORMED |
| DATA_EMPTY | OUTPUT | NORMAL DATA REGION EMPTY:NO ADDITIONAL READ CAN BE PERFORMED |
| PTP_FULL | OUTPUT | PRIORITIZED DATA REGION FULL:NO ADDITIONAL DATA WRITE CAN BE PERFORMED |
| PTP_EMPTY | OUTPUT | PRIORITIZED DATA REGION EMPTY:NO ADDITIONAL READ CAN BE PERFORMED |
| DATA_COUNT | OUTPUT | VECTOR OF NUMBER OF DATA WORDS CURRENTLY IN NORMAL DATA REGION |
| PTP_COUNT | OUTPUT | VECTOR OF NUMBER OF DATA WORDS CURRENTLY IN PRIORITIZED DATA REGION |

SYSTEM AND METHOD FOR SPLIT RING FIRST IN FIRST OUT BUFFER MEMORY WITH PRIORITY

FIELD OF TECHNOLOGY

Embodiments of the present invention relate to communication systems generally. More particularly, embodiments of the present invention relate to First In First Out (FIFO) buffer memory systems.

BACKGROUND

Buffer memories are used to temporarily store data received from a source to be transmitted to a destination. In a First In First Out (FIFO) buffer memory, as the name indicates, data that is first stored in the buffer memory is first retrieved and transmitted to the destination. FIFO buffer memories are used in communication devices to temporarily store data packets that are transmitted from a source to a destination.

As one skilled in the art appreciates, in a modern communication system, there may be multiple intermediary communication devices between a source device and a destination device. And, each of the communication devices may receive data packets from multiple sources. Additionally, the data packets may be assembled based on different communication protocols.

As data packets based on multiple protocols are received by a communication device for processing and forwarding to a next communication device, the data packets are temporarily stored in a FIFO buffer memory. The communication device may have to process the data packets stored in the FIFO memory for further transmission. Existing techniques for FIFO buffer memory management may not efficiently process the data packets stored in the FIFO memory.

SUMMARY

A system and method for allocating memory locations in a buffer memory system is described. According to one aspect of the present invention, a buffer memory system is disclosed. The buffer memory system includes a plurality of memory locations for storage and a controller. The controller is configured to control the storage and retrieval of data from the plurality of memory locations, and to allocate a first portion of the plurality of memory locations of the buffer memory to a first buffer, wherein the remaining portion of the plurality of memory locations defines a second portion. The controller is further configured to allocate a portion of the second portion to a second buffer and a remaining portion of the second portion defines a third portion. The controller is also configured to reserve a portion of the third portion for assignment to the second buffer, wherein the second buffer is assigned a higher priority over the first buffer. The controller selectively allocates one or more memory locations of the third portion to the first buffer or to the second buffer.

According to another aspect of the present invention, a method for allocating memory locations in a buffer memory system is disclosed. The method includes allocating a first portion of the plurality of memory locations to a first buffer, with a remaining portion of the plurality of memory locations defining a second portion. A portion of the second portion is allocated to a second buffer, with remaining portions of the second portion defining a third portion available for allocation to either the first buffer or the second buffer. A portion of the third portion is reserved for assignment to the second buffer, with the second buffer assigned a higher priority over the first buffer. One or more of the memory locations of the third portion is selectively assigned to the first buffer or to the second buffer.

According to another aspect of the present invention, a non-transitory computer readable storage medium for allocating memory locations in a buffer memory system has instructions that, when executed by a computing device causes the computing device to perform the method as described above.

BRIEF DESCRIPTION OF THE DRAWINGS

Various preferred embodiments are described herein with reference to the drawings, wherein:

FIG. 4B illustrates a table with various control signals of a controller of the controller of FIG. 4A;

The drawings described herein are for illustration purposes only and are not intended to limit the scope of the present invention in any way.

DETAILED DESCRIPTION

Figure 1:
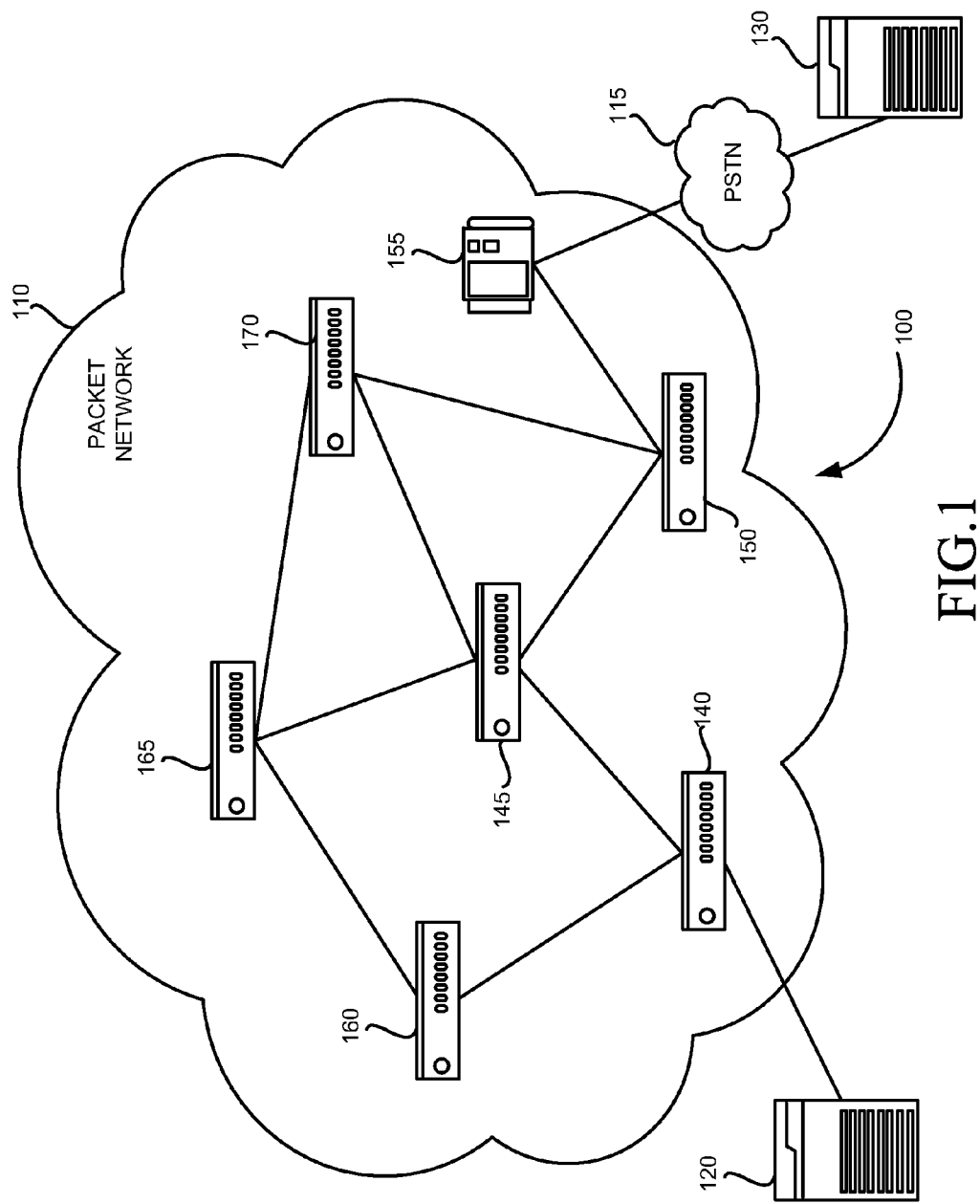
FIG. 1 illustrates an exemplary communication network, according to an embodiment of this invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may traverse along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
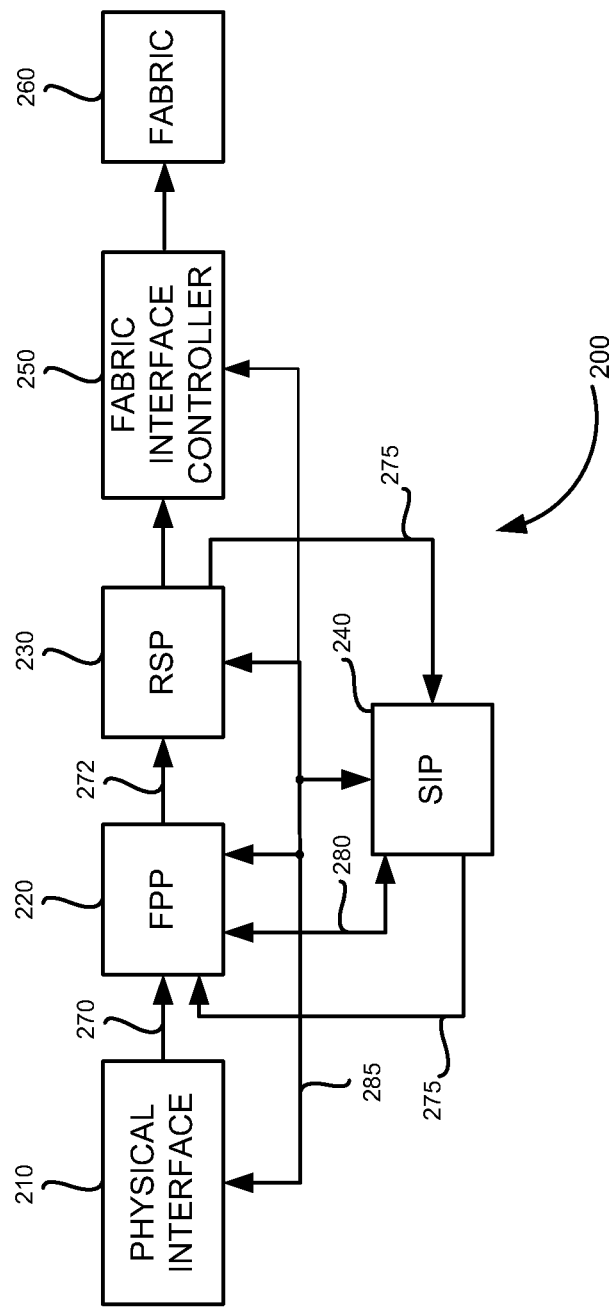
FIG. 2 illustrates a block diagram of a router architecture, according to an embodiment of this invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also include a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units (PDUs) from the physical interface 210. The FPP 220 analyzes and classifies the PDUs and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packets and conclusions to the RSP 230. The second communication link 272 may be a POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the PDUs classified by the FPP 220. The RSP 230 uses the classification information received from the FPP 220 to determine the starting offset and the length of the PDU payload, which provides the classification conclusion for the PDU. The classification information may be used to determine the port and the associated RSP 230 selected for the PDU. The RSP 230 may also receive additional PDU information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and cyclical redundancy checks (CRCs). The RSP 230 may be programmed using a scripting language with semantics similar to the C language. Such script languages are well known in the art. Also connected to the RSP 230 are the fabric interface controller 250 and the fabric network 260. The fabric interface controller 250 provides the physical interface to the fabric 260, which is typically a communications network.

The SIP 240 allows centralized initialization and configuration of the FPP 220, the RSP 230 and to the physical interface 210 and fabric interface controller 250. The SIP 240, in one embodiment, may provide policing, manage state information and provide a peripheral component interconnect (PCI) connection to a host computer.

Figure 3:
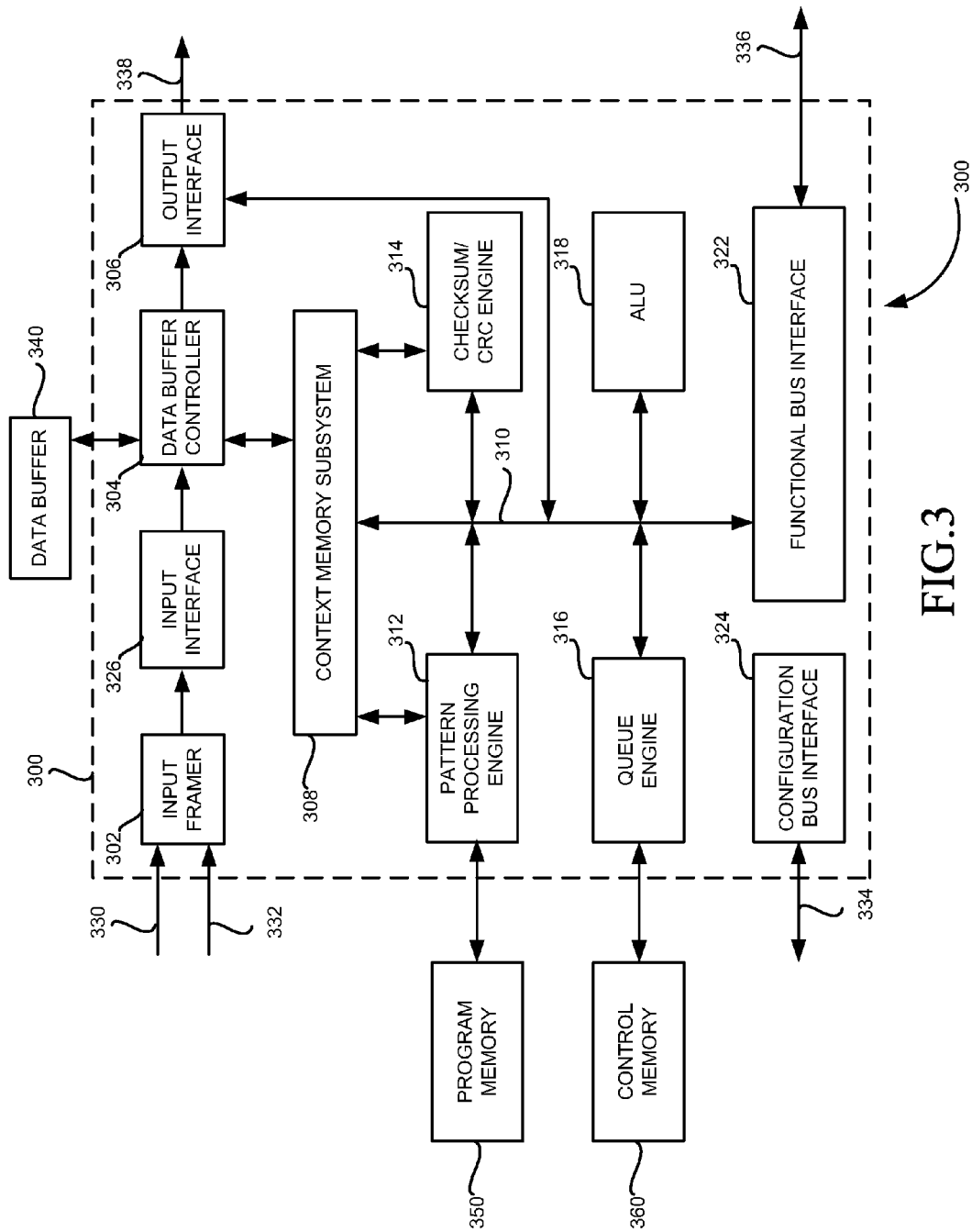
FIG. 3 illustrates a block diagram of a fast pattern processor (FPP), according to an embodiment of this invention.

Turning now to FIG. 3, illustrated is a block diagram of an embodiment of a fast pattern processor (FPP), generally designated 300, constructed in accordance with the principles of the present invention. The FPP 300 includes an input framer 302 that receives PDUs via external input data streams 330, 332. The input framer 302 frames packets containing the PDUs into 64-byte processing blocks and stores the processing blocks into an external data buffer 340, through an input interface 326. The input interface 326 will further be described later. The input data streams 330, 332 may be 32-bit UTOPIA/POS-PHY from PHY (physical interface 210) and 8-bit POS-PHY management path interface from SIP 240 (FIG. 2), respectively.

Typically, a data buffer controller 304 is employed to store the processing blocks to the external data buffer 340. The data buffer controller 304 also stores the processing blocks and associated configuration information into a portion of a context memory subsystem 308 associated with a context, which is a processing thread. As illustrated, the context memory subsystem 308 is coupled to a data buffer controller 304.

Additionally, the context memory subsystem 308 is coupled to a checksum/cyclical redundancy check (CRC) engine 314 and a pattern processing engine 312. The checksum/CRC engine 314 performs checksum or CRC functions on a processing block and on the PDUs embodied with the processing block. The pattern processing engine 312 performs pattern matching to determine how PDUs are classified and processed. The pattern processing engine 312 is coupled to a program memory 350.

The FPP 300 further includes a queue engine 316 and an arithmetic logic unit (ALU) 318. The queue engine 316 manages replay contexts for the FPP 300, provides addresses for block buffers and maintains information on blocks, PDUs, and connection queues. The queue engine 316 is coupled to an external control memory 360 and an internal function bus 310. The ALU 318 is coupled to the internal function bus 310 and is capable of performing associated computational functions.

Also coupled to the internal function bus 310 is a functional bus interface 322. The functional bus interface 322 passes external functional programming language function calls to external logic through a data port 336. In one exemplary embodiment, the data port 336 is a 32-bit connection to the SIP 240 (FIG. 2). The FPP 300 also includes a configuration bus interface 324 for processing configuration requests from externally coupled processors. As illustrated, the configuration bus interface 324 may be coupled to a data port 334, such as an 8-bit CBI source.

Additionally, coupled to the internal function bus 310 is an output interface 306. The output interface 306 sends PDUs and their classification conclusions to the downstream logic. The output interface 306 may retrieve the processing blocks stored in the data buffer 340, for example, by issuing commands to the context memory subsystem 308 and send the PDUs embodied within the processing blocks to an external unit through an output data port 338. The output data port 338, in an exemplary embodiment, is a 32-bit POS-PHY connected to the RSP 230 (FIG. 2).

Figure 4:
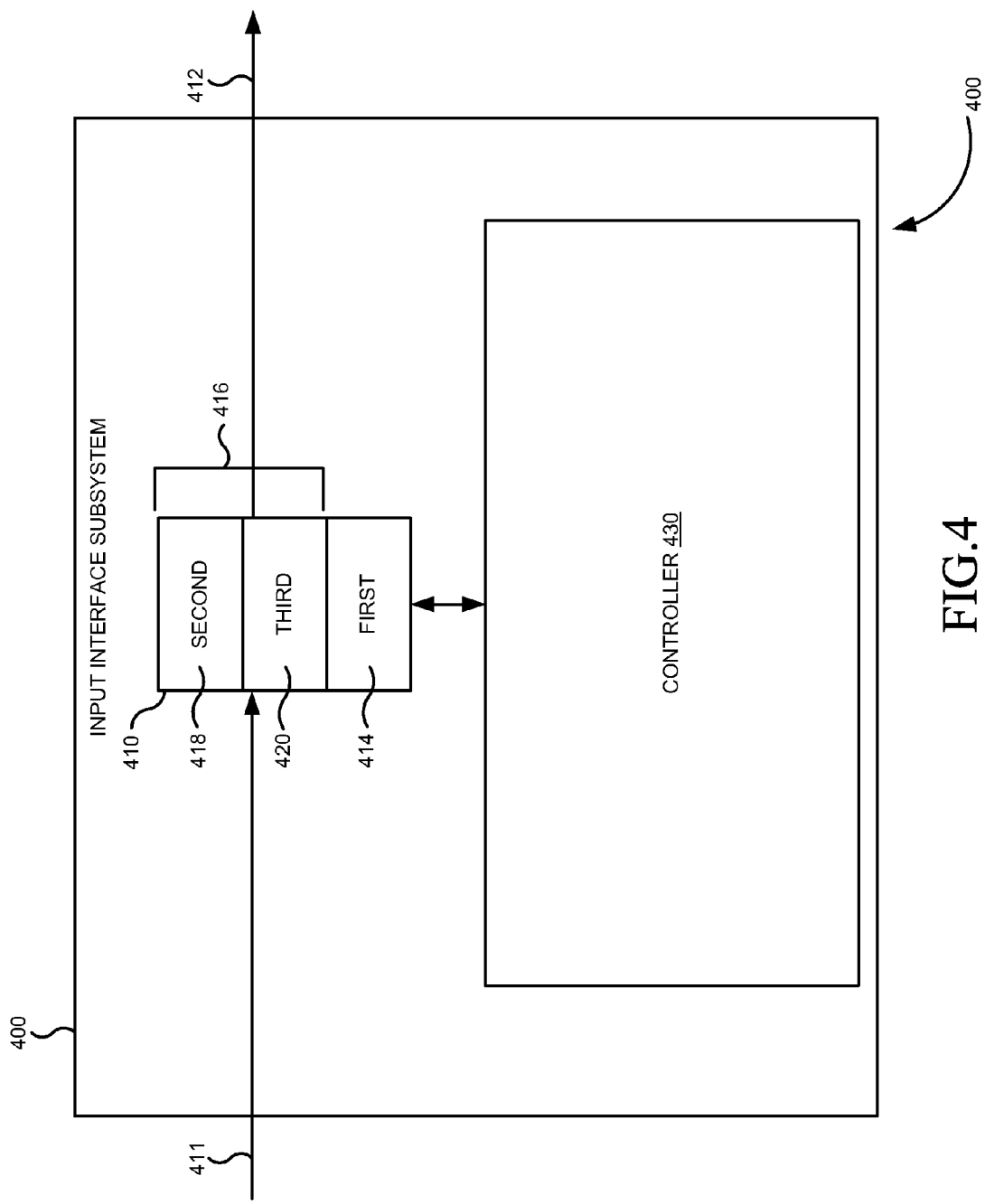
FIG. 4 illustrates a block diagram of an input interface subsystem with an exemplary FIFO buffer memory, according to an embodiment of this invention.

Turning now to FIG. 4, illustrated is a block diagram of an embodiment of an input interface subsystem, generally designated 400, constructed in accordance with the principles of the present invention. The input interface subsystem 400 may be embodied in a fast pattern processor (FPP), as described in FIG. 3 above, wherein the input interface 326 may be similar to the input interface subsystem 400. The input interface subsystem 400 receives processing blocks, associated with a protocol data unit (PDU), from the input framer 302.

The input interface subsystem 400 includes a first-in-first-out (FIFO) buffer 410 and a controller 430. The FIFO buffer 410 provides a buffering function by accepting processing blocks at its input 411 and clocking them through a collection of storage positions until they are transmitted via the output port 412.

The FIFO buffer 410 includes a plurality of memory locations for storage of processing blocks. A first portion 414 of the plurality of memory locations are allocated to a first buffer. The remaining portion of the plurality of memory locations define a second portion 416. A portion 418 of the second portion 416 of the plurality of memory locations is allocated to a second buffer. The remaining portion of the second portion 416 defines a third portion 420 of the plurality of memory locations. The third portion 420 of the plurality of memory locations is available for selective allocation to either the first buffer or the second buffer. In one embodiment, one of the buffers of the first buffer and the second buffer, for example, the second buffer, is assigned a higher priority. A portion of the third portion 420 is reserved for allocation to the buffer assigned higher priority, in this case, second buffer. Further construction and operation of the FIFO buffer will be described later.

The FIFO buffer 410 employs a first clock zone having a first clock rate CR1 that is associated with clocking the processing blocks through an output portion of the FIFO buffer 410. Additionally, the FIFO buffer 410 employs a second clock zone having a second clock rate CR2 that is associated with clocking the processing blocks through an input portion of the FIFO buffer 410. The first and second clock zones allow the FIFO buffer 410 to accommodate different timing requirements for processing blocks being retrieved and retransmitted by the input interface subsystem 400. The first and second clock rates (CR1, CR2, respectively), are asynchronous, meaning that the clocking transitions associated with the first and second clock rates CR1, CR2, do not always occur at the same time.

Figure 4A:
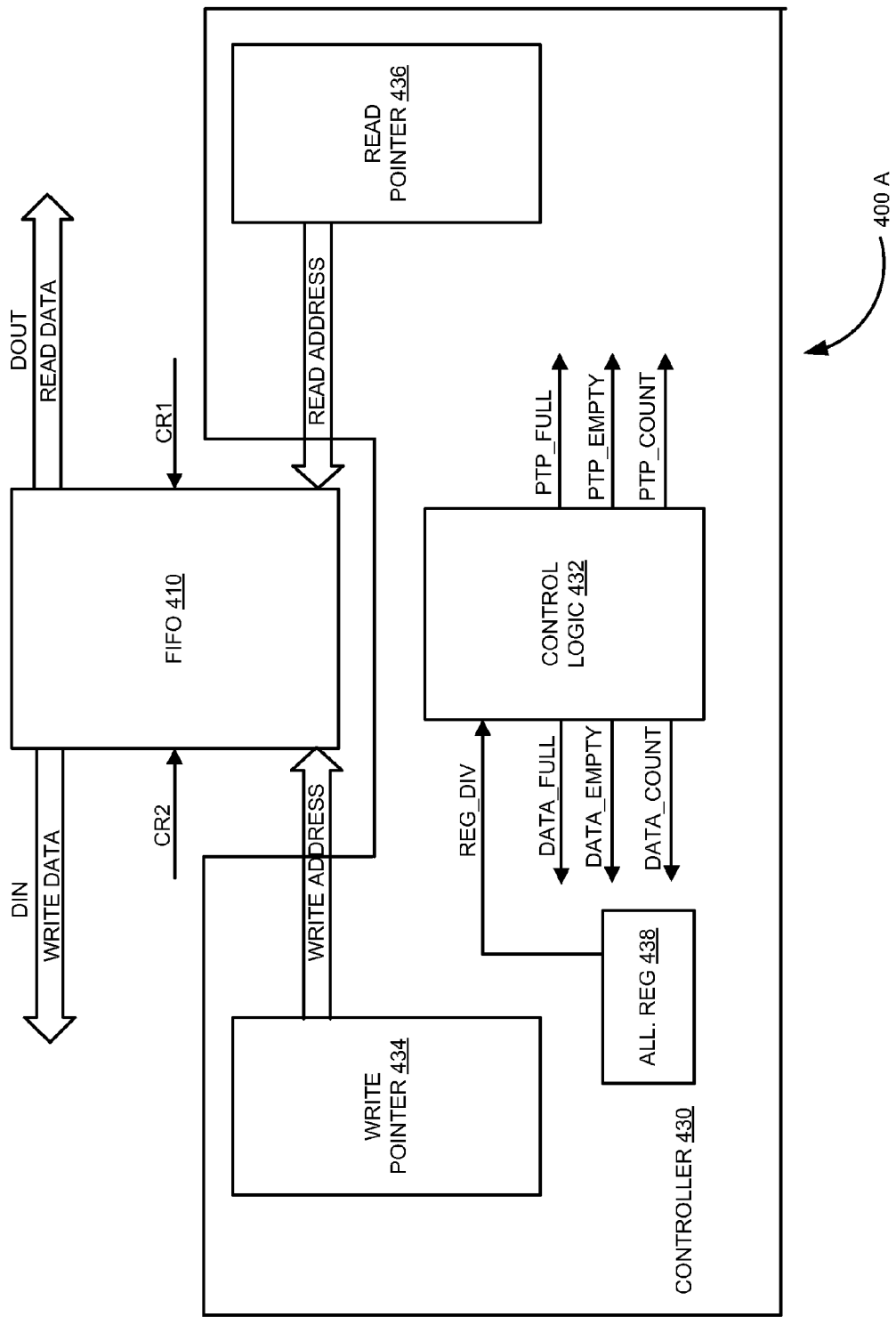
FIG. 4A illustrates a block diagram of a controller of the input interface subsystem of FIG. 4.

Now referring to FIG. 4A, the controller 430 is further described. The controller 430 of the input interface subsystem 400 further includes a control logic 432, a write pointer logic 434, a read pointer logic 436 and an allocation register 438. The write pointer logic 434 stores a plurality of address locations pointing to the next location of the FIFO buffer to be written. For example, the write pointer logic 434 may store the address location pointing to the next location to be written in the first buffer and the second buffer. As each memory location of the first buffer and the second buffer is written, the address is updated to point to the next location.

The read pointer logic 436 stores a plurality of address locations pointing to the memory locations to be read from the FIFO, for example, from the first buffer and the second buffer. As each memory location of the first buffer and the second buffer is read, the address in the read pointer logic 436 is updated to point to the next memory location of the first buffer and the second buffer respectively.

The allocation register 438 is configurable or programmable. The control logic 432 is configured to read the allocation register 438. The allocation register 438 may store a plurality of attributes related to the FIFO memory. For example, the allocation register 438 may store information related to the assigned priority to the first buffer and the second buffer. Additionally, the allocation register 438 may store information related to the portion of the second portion of the memory location allocated to the buffer assigned a higher priority, in this example, the second buffer.

In one embodiment, the portion allocated to the buffer assigned a higher priority may be expressed as a division factor or a percentage of available memory locations in the second portion. For example, a division factor of 2 may indicate that the available memory is divided into two equal portions and one of the portions is preferentially allocated to the buffer assigned a higher priority. In other words, 50% of the available memory is preferentially allocated to the buffer assigned a higher priority. Similarly, a division factor of 3 may indicate that the available memory in the second portion is divided into three equal portions and one of the portions is preferentially allocated to the buffer assigned a higher priority. As one skilled in the art appreciates, other indicators may be used to define the portion of the second portion of the memory location to be preferentially allocated to the buffer assigned a higher priority.

The control logic 432 is configured to store various statuses of the buffer memory. The control logic 432 may also assign a priority to the first buffer and the second buffer. In one embodiment, the second buffer has a higher priority than the first buffer. The control logic 432 may also generate various status signals. Some of the status signals may indicate the status of the first buffer and the second buffer.

Referring to FIG. 4B, table 460 shows various control logic signals of the control logic 432. For example, column 462 shows names of the control signal, column 464 shows the type of the control signal as to whether the signal is an input to the control logic 432 or an output of the control logic 432. Column 464 shows the corresponding description for various control logic. The normal data region refers to the first buffer and prioritized data region refers to the second buffer, which is assigned a higher priority.

Now, referring to FIGS. 5A-5D, the construction and operation of the FIFO buffer 410 with eight memory locations will be further described. As one skilled in the art appreciates, the disclosure is not limited to eight memory locations and further, each memory location may store a plurality of bits or bytes of data.

Figures 5A, 5B:
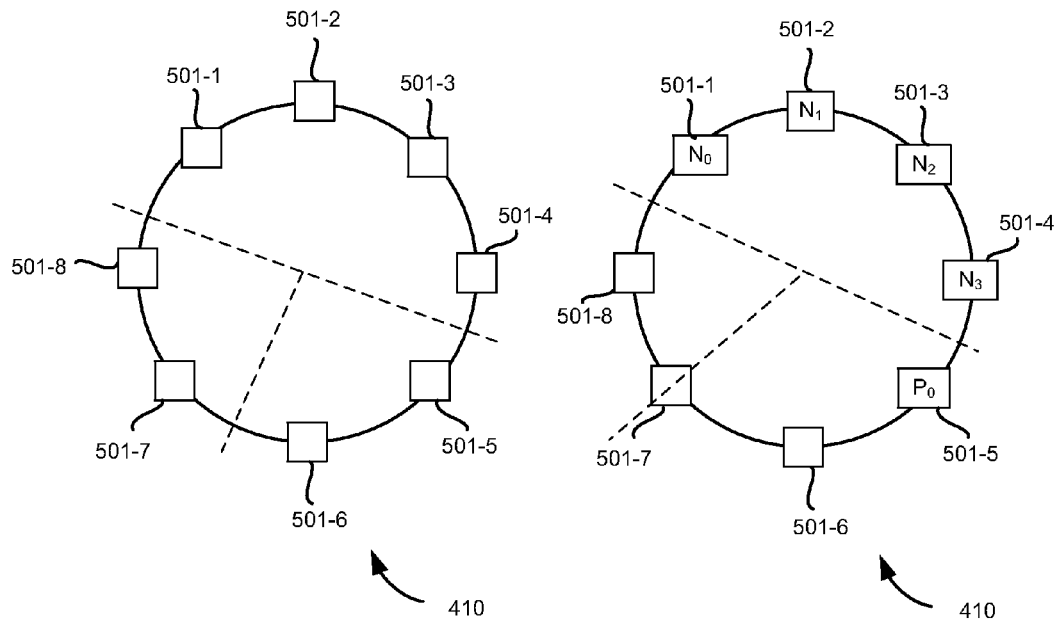
FIG. 5A-5E illustrates FIFO buffer memory of FIG. 4 implemented as a split ring FIFO buffer memory, according to an embodiment of this invention.

Referring now to FIG. 5A, the FIFO buffer 410 has eight memory locations, 501-1 through 501-8. The memory locations 501-1 through 501-4 define a first portion and are assigned to first buffer. The memory locations 501-5 through 501-8 define the second portion. A portion of the second portion, in this case, memory locations 501-5 and 501-6 may be assigned to second buffer. In this example, the available memory locations for assignment to second buffer is four and using a division factor of 2 (or 50% of the available locations), the number of locations that may be assigned to second buffer is two. Locations 501-7 and 501-8 define the third portion and are available for selective assignment to either the first buffer or the second buffer.

In one embodiment, the first buffer and the second buffer are arranged as a ring buffer. For example, as a ring buffer, the memory locations of first buffer will be used in the following sequence to store and retrieve data- memory locations 501-1, 501-2, 501-3, 501-4 and back to 501-1. If memory location 501-8 is later allocated to the first buffer from the third portion, the sequence to store and retrieve data will be memory locations 501-1, 501-2, 501-3, 501-4, 501-8 and back to 501-1. As one skilled in the art appreciates, such an allocation will continue to maintain the ring buffer structure of the first buffer.

Now referring to FIG. 5B, the state of the FIFO buffer 410 is depicted after storing four data packets N0, N1, N2 and N3 in the first buffer and one data packet P0 in the second buffer. The data packets N0, N1, N2 and N3 are stored in memory locations 501-1 through 501-4 of first buffer. The data packet P0 is stored in memory location 501-5. As one skilled in the art appreciates, the first buffer has no additional memory locations for storage of data packets and is considered full. Also, there are three memory locations available in the third portion, for allocation to the first buffer and the second buffer.

Again, based on the preconfigured division factor, a portion of the available memory locations in the third portion is available for preferential allocation to the second buffer. In this case, 1.5 locations are available for preferential allocation to the second buffer. In one embodiment, this may be rounded off to the nearest integer, for example, two locations.

Figures 5C, 5D:
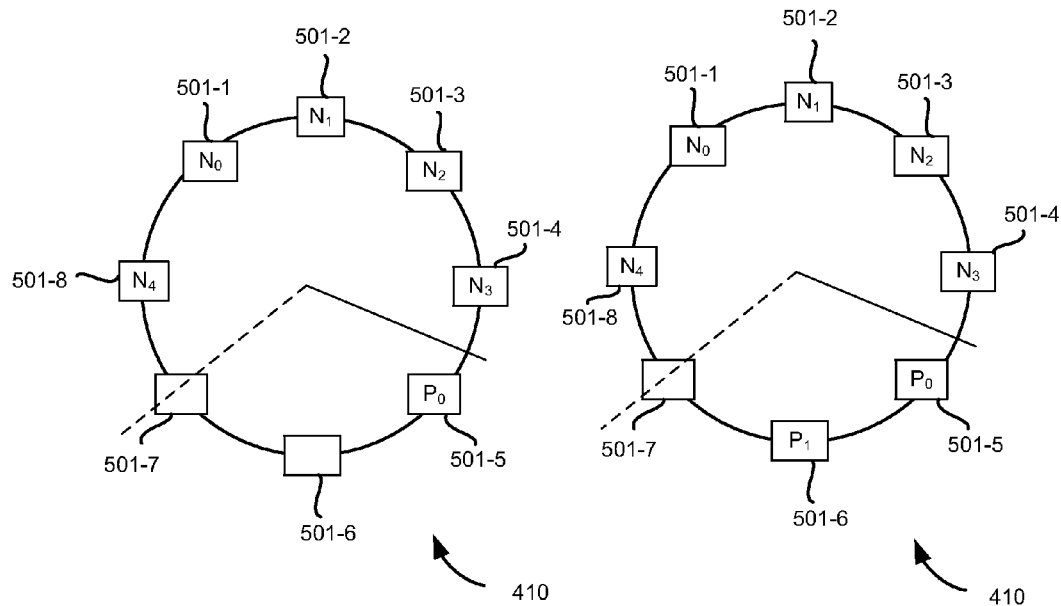

Now referring to FIG. 5C, the state of the FIFO buffer 410 after receipt of another data packet (N4) to be stored in the first buffer is shown. Previously allocated memory locations to the first buffer are already used. However, there is at least one memory location (501-8) available for allocation from the third portion to the first buffer. Additionally, the ring buffer structure of the first buffer will continue to be maintained if the memory location 501-8 is allocated to the first buffer. Therefore, the memory location 501-8 is allocated to the first buffer and the data packet N5 is stored in the memory location 501-8.

Now referring to FIG. 5D, the state of the FIFO buffer 410 after receipt of another data packet (P1) to be stored in the second buffer is shown. The memory location 501-6 is available for storage of the data packet P1 and the data packet P1 is stored in the memory location 501-6. Now, the third portion has only one memory location (501-7) available for allocation, and based on the division factor of 2 for available locations, this location is preferentially available for allocation to the second buffer.

Figure 5E:
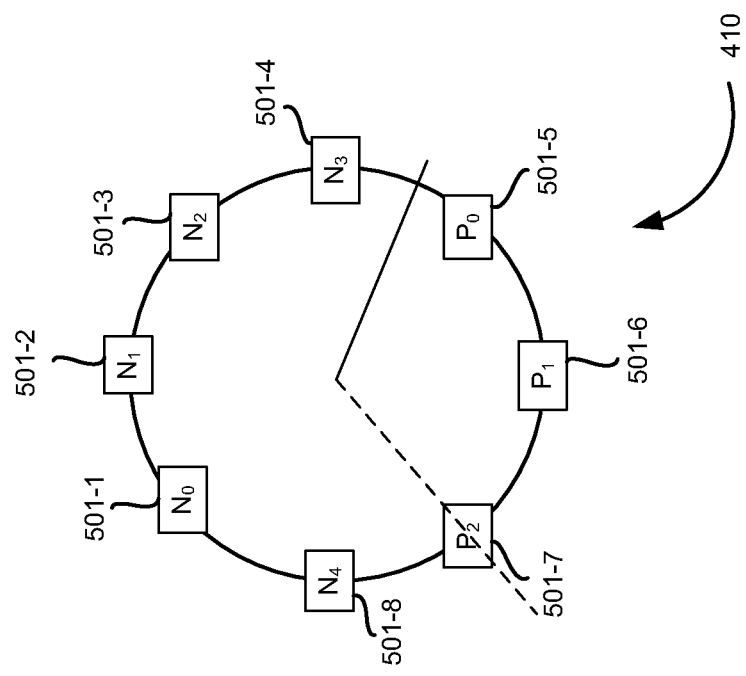

Now referring to FIG. 5E, the state of the FIFO buffer 410 after receipt of another data packet (P2) to be stored in the second buffer is shown. The memory location 501-7 is available for storage of the data packet P2 and the data packet P2 is stored in the memory location 501-7. The allocation of memory location 501-7 to the second buffer still maintains the ring buffer structure of the second buffer, as the sequence of storage of the memory locations will be 501-5, 501-6, 501-7 and back to 501-5.

If instead of receiving data packet P2 for storage in the second buffer, another data packet N5 was received for storage in the first buffer, this data packet N5 will be dropped, as allocation of memory location 501-7 will change the sequence to 501-1, 501-2, 501-3, 501-4, 501-8, 501-7 and back to 501-1which creates a broken ring for the first buffer.

In one embodiment, the data packets stored in the second buffer are preferentially read first over data packets stored in the first buffer, so as to keep sufficient free memory locations for storage of incoming data packets in the second buffer. In one embodiment, the data packets stored in the first buffer may be from multiple sources. Although a division factor of 2 has been used for initial allocation of memory locations to the second buffer and subsequent allocation of memory locations to the second buffer, different division factor may be used for initial allocation and subsequent allocation of memory locations. In one embodiment, the division factor may be changed, based upon the usage of allocated or reserved memory locations by the first buffer and the second buffer.

Although in the example described with reference to FIG. 5A-5E, the memory locations 501-5 and 501-6 were initially assigned to the second buffer, the structure and operation of the FIFO buffer 410 will be similar, if instead, memory locations 501-7 and 501-8 were initially assigned to the second buffer.

Figure 6:
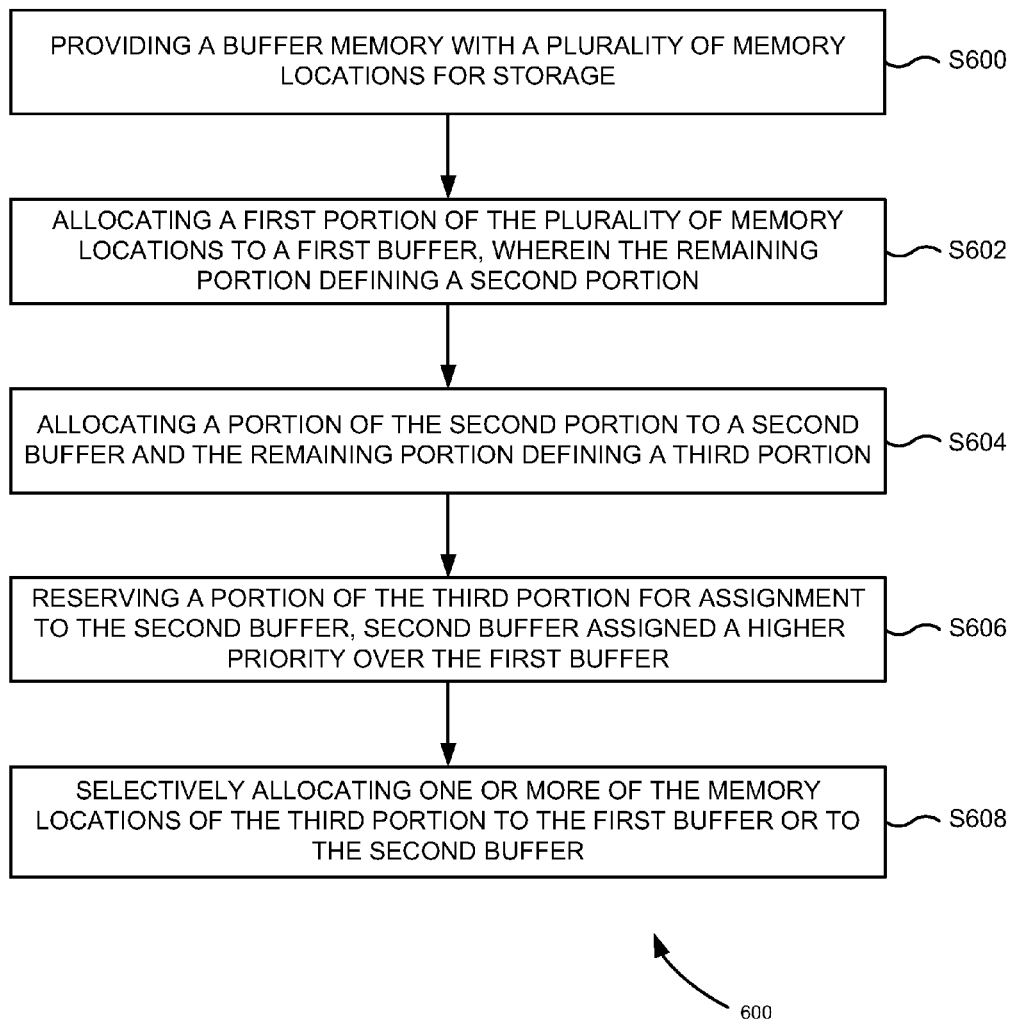
FIG. 6 illustrates an exemplary flow diagram according to an embodiment of this disclosure.

Now, referring back to FIG. 6, an exemplary flow diagram for allocating memory locations in a buffer memory system is described. In block S600, a buffer memory with a plurality of memory locations for storage is provided. For example, the buffer memory may be the FIFO buffer 410 described hereinbefore.

In block S602, a first portion of the plurality of memory locations are allocated to the first buffer. The remaining portion of the memory locations defines a second portion. For example, first portion 414 of the FIFO buffer 410 is allocated to the first buffer. The remaining portion of the memory locations of the FIFO buffer 410 define the second portion 416.

In block S604, a portion of the second portion is allocated to a second buffer and the remaining portion defines a third portion. For example, a portion 418 of the second portion 416 is allocated to the second buffer. The remaining portion defines the third portion 420. In one embodiment, the portion 418 of the second portion 416 is determined by using a division factor. The division factor is used to divide the second portion to determine the portion 418.

In block S606, a portion of the third portion is reserved for assignment to the second buffer. The second buffer is assigned a higher priority over the first buffer. For example, a portion of the third portion 420 is reserved for assignment to the second buffer. In one embodiment, a division factor is used to determine the portion of the third portion 420 to be reserved for assignment to the second buffer.

In block S608, one or more of the memory locations of the third portion are selectively allocated to the first buffer and the second buffer. Referring to FIGS. 5A-5E, various memory locations of the third portion are selectively allocated to the first buffer and the second buffer. In some embodiments, the selective allocation is based on whether the first buffer or the second buffer is full. In some embodiments, the selective allocation is based on whether the allocation of the available memory location retains the ring buffer structure of the first buffer and the second buffer.

The present invention may also include a computer product which may be a storage medium including instructions which can be used to program a computing device to perform a process in accordance with the present invention. The storage medium can include, but is not limited to, any type of disk including floppy disk, optical disk, CD-ROM, magneto-optical disks, ROMS, RAMs, EPROMs, EEPROMS, flash memory, magnetic or optical cards, or any type of media suitable for storing electronic instructions.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuits (ASICs)).

What is claimed is:

1. A buffer memory system, comprising:
a buffer memory residing in a fast pattern processor of a network device, the buffer memory including a plurality of memory locations for storage; and
a controller configured to
control the storage and retrieval of data from the plurality of memory locations,
allocate a first portion of the plurality of memory locations of the buffer memory to a first buffer, wherein the remaining portion of the plurality of memory locations define a second portion;
allocate a portion of the second portion to a second buffer and the remaining portion of the second portion defines a third portion, wherein the first buffer and the second buffer are arranged as a ring buffer;
reserve a portion of the third portion for assignment to the second butler, with the second buffer assigned a higher priority over the first buffer; and
selectively allocate remaining one or more memory locations of the third portion to the first buffer or to the second buffer by retaining ring buffer structure of the first buffer and the second buffer where an allocated first memory location follows an allocated last memory location in each of the first buffer and the second buffer.

2. The buffer memory system of claim 1, wherein the stored locations of the second buffer are preferentially read over the stored locations of the first buffer.

3. The buffer memory system of claim 2, wherein the first buffer is assigned to store data from a first input data stream and the second buffer is assigned to store data from a second input data stream.

4. The buffer memory system of claim 3, wherein the second input data stream is based on an IEEE 1588 protocol.

5. The buffer memory system of claim 3, wherein the fast input data stream and the second input data stream are received by a physical interface of a network device, before being processed by the controller.

6. The buffer memory system of claim 5, wherein the controller is part of the fast pattern processor of the network device.

7. A method for allocating memory locations in a buffer memory system, comprising:
providing a buffer memory with a plurality of memory locations for storage. wherein the buffer memory is a part of a fast pattern processor of a network device:
allocating a first portion of the plurality of memory locations to a first buffer, wherein the remaining portion of the plurality of memory locations defines a second portion;
allocating a portion of the second portion to a second buffer, the remaining portion of the second portion defining a third portion available for allocation to either the first buffer or the second buffer, wherein the first buffer and the second buffer are arranged as a ring buffer;
reserving a portion of the third portion for assignment to the second buffer, with the second buffer assigned a higher priority over the first buffer: and
selectively assigning remaining one or more of the memory locations of the third portion to the first buffer or to the second buffer by retaining ring buffer structure of the first buffer and the second buffer where an allocated first memory location follows an allocated last memory location in each of the first buffer and the second buffer.

8. The method of claim 7, further including assigning the first buffer to store data from a first input data stream and assigning the second buffer to store data from a second input data stream.

9. The method of claim 8, wherein the second input data stream is based on an IEEE 1588 protocol.

10. The method of claim 8, wherein the stored data in the second buffer is preferentially read over the first buffer.

11. The method of claim 8, wherein the first input data stream and the second input data stream are received by a physical interface of a network device, before storing data in the first buffer and the second buffer.

12. A non-transitory computer readable storage medium having instructions that, when executed by a computing device causes the computing device to:
provide a buffer memory with a plurality of memory locations for storage, wherein the buffer memory is a part a fast pattern processor of a network device;
allocate a first portion of the plurality of memory locations to a first buffer, wherein the remaining portion of the plurality of memory locations defines a second portion:
allocate a portion of the second portion to a second buffer. the remaining portion of the second portion defining a third portion available for allocation to either the first buffer or the second buffer, wherein the first buffer and the second buffer are arranged as a ring buffer;
reserve a portion of the third portion for assignment to the second buffer, with the second buffer assigned a higher priority over the first buffer; and
selectively assign remaining one or more of the memory locations of the third portion to the fast buffer or to the second buffer by retaining ring buffer structure of the first buffer and the second buffer where an allocated first memory location follows an allocated last memory location in each of the first buffer and the second buffer.

\* \* \* \* \*